(12) United States Patent
Chen

(10) Patent No.: US 11,148,077 B2
(45) Date of Patent: Oct. 19, 2021

(54) COMPOSITE FILTER CARTRIDGE

(71) Applicant: FOSHAN VIOMI ELECTRICAL TECHNOLOGY CO., LTD., Foshan (CN)

(72) Inventor: Xiaoping Chen, Foshan (CN)

(73) Assignee: Foshan Viomi Electrical Technology Co., Ltd., Foshan Guangdong (CN)

( * ) Notice: Subject to any disclaimer, the term of this patent is extended or adjusted under 35 U.S.C. 154(b) by 453 days.

(21) Appl. No.: 16/066,741

(22) PCT Filed: Mar. 2, 2017

(86) PCT No.: PCT/CN2017/075413
§ 371 (c)(1),
(2) Date: Jun. 28, 2018

(87) PCT Pub. No.: WO2017/118445
PCT Pub. Date: Jul. 13, 2017

(65) Prior Publication Data
US 2019/0009192 A1 Jan. 10, 2019

(30) Foreign Application Priority Data
Jan. 4, 2016 (CN) .......................... 201610000936.3

(51) Int. Cl.
*B01D 29/15* (2006.01)
*B01D 29/58* (2006.01)
(Continued)

(52) U.S. Cl.
CPC ............. *B01D 29/15* (2013.01); *B01D 29/52* (2013.01); *B01D 29/54* (2013.01); *B01D 29/58* (2013.01); *B01D 35/301* (2013.01); *B01D 39/18* (2013.01); *B01D 39/2055* (2013.01); *C02F 1/001* (2013.01); *B01D 2201/29* (2013.01); *B01D 2201/291* (2013.01); *B01D 2201/298* (2013.01); *B01D 2201/316* (2013.01); *B01D 2201/347* (2013.01); *B01D 2201/4015* (2013.01); *B01D 2201/46* (2013.01); *C02F 2201/006* (2013.01)

(58) Field of Classification Search
CPC .................................................. B01D 35/301
See application file for complete search history.

(56) References Cited

U.S. PATENT DOCUMENTS

| 2,748,949 | A | * | 6/1956 | James | B01D 29/54 210/295 |
| 3,390,778 | A | * | 7/1968 | Uhen | B01D 27/148 210/314 |

(Continued)

*Primary Examiner* — David C Mellon
(74) *Attorney, Agent, or Firm* — Rosenberg, Klein & Lee

(57) ABSTRACT

A composite filter cartridge, comprising a filter cartridge body provided with two filter devices. Each filter device is respectively provided with a support component which fixes the filter device, and the filter devices are arranged in a linear manner and fixed with respect to one another. Each filter device is respectively provided with an independent housing, a filter module and a filter water channel, the filter module and the filter water channel being arranged within the housing, the filter water channel sequentially comprising a water inlet cavity and a water outlet cavity, the water inlet cavity and the water outlet cavity being connected via the corresponding filter module.

6 Claims, 5 Drawing Sheets

(51) Int. Cl.
*B01D 29/54* (2006.01)
*B01D 29/52* (2006.01)
*B01D 35/30* (2006.01)
*B01D 39/18* (2006.01)
*B01D 39/20* (2006.01)
*C02F 1/00* (2006.01)

(56) References Cited

U.S. PATENT DOCUMENTS

| | | | | |
|---|---|---|---|---|
| 3,914,176 | A * | 10/1975 | Holmes | B01D 35/147 |
| | | | | 210/132 |
| 4,036,755 | A * | 7/1977 | Dahm | B01D 27/08 |
| | | | | 210/167.04 |
| 4,769,143 | A * | 9/1988 | Deutsch | B01D 61/18 |
| | | | | 210/266 |
| 4,830,749 | A * | 5/1989 | Okamoto | B01D 25/26 |
| | | | | 210/323.2 |
| 4,869,820 | A * | 9/1989 | Yee | B01D 29/072 |
| | | | | 210/316 |
| 5,141,637 | A * | 8/1992 | Reed | B01D 29/15 |
| | | | | 210/232 |
| 2008/0179263 | A1* | 7/2008 | Wieczorek | B01D 29/54 |
| | | | | 210/806 |
| 2014/0131265 | A1* | 5/2014 | Patera | B01D 24/007 |
| | | | | 210/201 |
| 2017/0204821 | A1* | 7/2017 | Willems | B01D 36/006 |
| 2018/0008912 | A1* | 1/2018 | Spelter | F02M 37/44 |
| 2018/0133631 | A1* | 5/2018 | Willems | B01D 37/04 |

* cited by examiner

COMPOSITE FILTER CARTRIDGE

BACKGROUND OF THE INVENTION

Field of the Invention

The present invention relates to a composite filter cartridge.

Description of the Related Art

In the conventional technology, several filter materials are disposed inside a single housing to form a composite filter cartridge. The conventional composite filter cartridge only has a single water inlet. Thus, several sets of composite filter cartridges must be used if several water sources from different piping systems are to be filtered. It brings about many inconveniences. Besides, the water inlet and water outlet of the conventional composite filter cartridge are respectively arranged in two ends thereof. It results in complexity and confusion of water piping.

SUMMARY OF THE INVENTION

The primary objective of the present invention is to provide a composite filter cartridge, which is rational and simple in structure and easy to install, and which has at least two filtering functions, whereby to solve the problems of the conventional technology.

In order to achieve the abovementioned objective, the present invention proposes a composite filter cartridge comprising a filter cartridge body provided with at least two filter devices and characterized in that each filter device is provided with a support component which fixes the filter device, and that the filter devices are arranged in a linear manner and fixed to one another, and that several filter devices respectively having different functions may be assembled together to form a multifunctional composite filter cartridge.

The objective of the present invention may also be realized by additional measures, which are introduced in the embodiments described below.

In one embodiment, each filter device is provided with an independent housing, a filter module and a filter water channel, wherein the filter module and the filter water channel are arranged within the housing. The filter water channel includes a water inlet cavity and a water outlet cavity, which interconnect through the corresponding filter module arranged therebetween. Because of having at least two filter water channels, the composite filter cartridge may be connected with several water pipes.

In one embodiment, the filter module includes a cylindrical filter and two end covers respectively disposed at two ends of the cylindrical filter. The water inlet cavity is formed between the outer surface of the filter module and the inner wall of the housing. The inner cavity of the cylindrical filter functions as the water outlet cavity.

In one embodiment, water inlets and water outlets, which are respectively corresponding to the water inlet cavities and the water outlet cavities of the filter devices, are arranged in an identical end of the filter cartridge body, whereby to convenience the installation of the filter cartridge body.

In one embodiment, the filter cartridge body is provided with two filter devices, including a first filter device and a second filter device. The interior of the first filter device is provided with a first water inlet cavity and a first water outlet cavity. One end in the exterior of the first filter device is provided with a first water inlet, a first water outlet, a second water inlet, and a second water outlet. Another end in the exterior of the first filter device is connected with one end of the second filter device. Another end of the second filter device is airtightly connected with a filter cover. The interior of the second filter device is provided with a second water inlet cavity and a second water outlet cavity. The second water inlet cavity and the second water outlet cavity are respectively connected with the second water inlet and the second water outlet through a water conduit.

In one embodiment, the first filter device includes a first housing and a first filter module. One end of the first housing is provided with the first water inlet, the first water outlet, the second water inlet, and the second water outlet. Another end of the first housing is opened. The first filter module is arranged inside the first housing. The filter module includes a first cylindrical filter, a first end cover and a second end cover, wherein the first end cover and the second end cover are respectively disposed at two ends of the first cylindrical filter. The first water inlet cavity is formed between the outer surface of the first cylindrical filter and the inner wall of the first housing. The inner cavity of the first cylindrical filter functions as the first water outlet cavity. The second filter device includes a second housing and a second filter module. One end of the second housing has a bottom plate; the bottom plate is airtightly connected with the open end of the first housing. Another end of the second housing is opened and airtightly connected with the filter cover. The second filter module is arranged inside the second housing. The second filter module includes a second cylindrical filter, a third end cover and a fourth end cover, wherein the third end cover and the fourth end cover are respectively disposed at two ends of the second cylindrical filter. The second water inlet cavity is formed between the outer surface of the second cylindrical filter and the inner wall of the second housing. The inner cavity of the second cylindrical filter functions as the second water outlet cavity. A water inlet channel and a water outlet channel are arranged inside the water conduit. The water conduit passes through the first water outlet cavity. Two ends of the water inlet channel respectively interconnect with the second water inlet and the second water inlet cavity. Two ends of the water outlet channel respectively interconnect with the second water outlet and the second water outlet cavity.

In one embodiment, the first cylindrical filter includes two layers. The inner layer thereof is a first carbon filter layer, and the outer layer thereof is an initial filter layer.

In one embodiment, the second cylindrical filter is a carbon filter.

In one embodiment, the first end cover is located near one end of the first housing; a first sleeve is arranged in a region of the inner cavity of the first cylindrical filter, which is corresponding to the surface of the first end cover. The water conduit passes the first sleeve. A first overflow gap exists between the first sleeve and the inner cavity of the first cylindrical filter. A second overflow gap exists between the first sleeve and the water conduit. The first overflow gap and the second overflow gap jointly form the first water outlet cavity.

In one embodiment, the third end cover is located near the first filter device; a second sleeve is arranged in a region of the inner cavity of the second cylindrical filter, which is corresponding to the surface of the third end cover. A third overflow gap exists between the second sleeve and the inner cavity of the second cylindrical filter. An overflow channel exists inside the second sleeve. The third overflow gap and the overflow channel jointly form the second water outlet cavity.

The present invention has the following advantages:

(1) Filter devices respectively with different functions may be assembled together in the composite filter cartridge of the present invention to form a multifunctional composite filter cartridge according to requirements of users.

(2) Each of the filter devices of the composite filter cartridge of the present invention is provided with an independent filter water channel; the water filter channels may be respectively connected with different water piping systems. Thereby, the present invention is exempted from the conventional problem: while water sources from different water piping systems are to be filtered, each piping system must be connected with a filter cartridge. Hence, the present invention can also save space.

(3) The water inlets and water outlets of the composite filter cartridge of the present invention are all arranged in an identical end of the filter cartridge body. Therefore, the water piping systems connected with the present invention may be all disposed in the same end of the present invention. Thus, the layout of the water piping systems becomes more rational and clear.

DETAILED DESCRIPTION OF THE INVENTION

The present invention is to be further described in detail with embodiments and attached drawings below.

Figure 1:
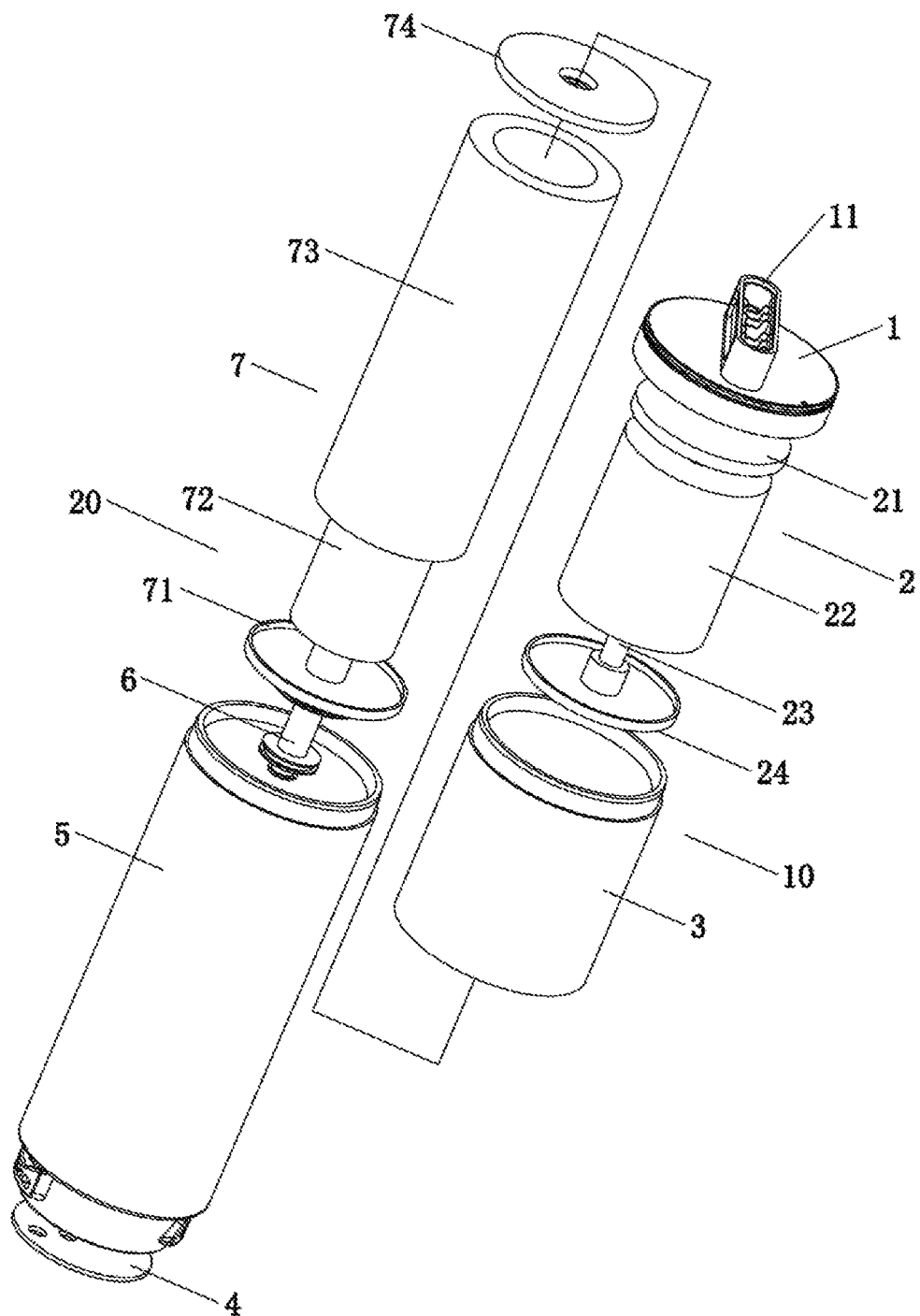
FIG. 1 is an exploded view schematically showing a structure of a composite filter cartridge according to one embodiment of the present invention.
Figure 2:
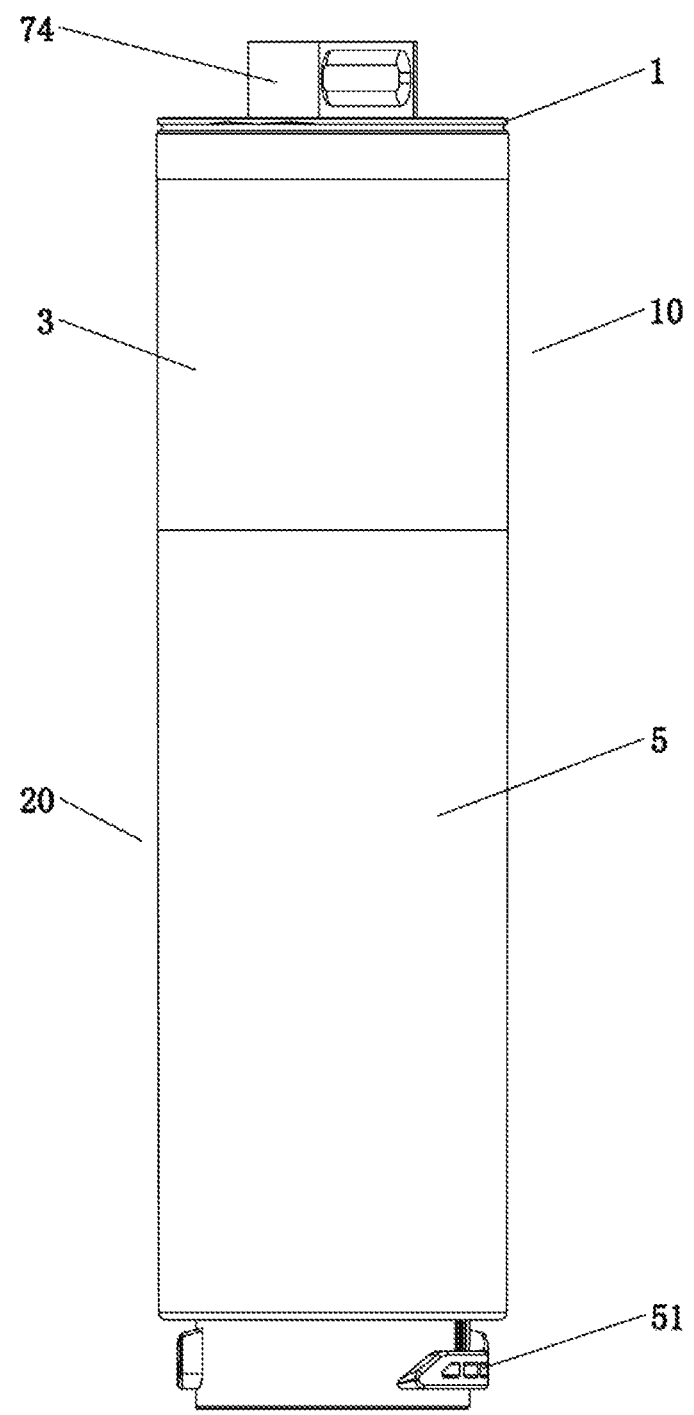
FIG. 2 is a front view schematically showing a structure of a composite filter cartridge according to one embodiment of the present invention.
Figure 3:
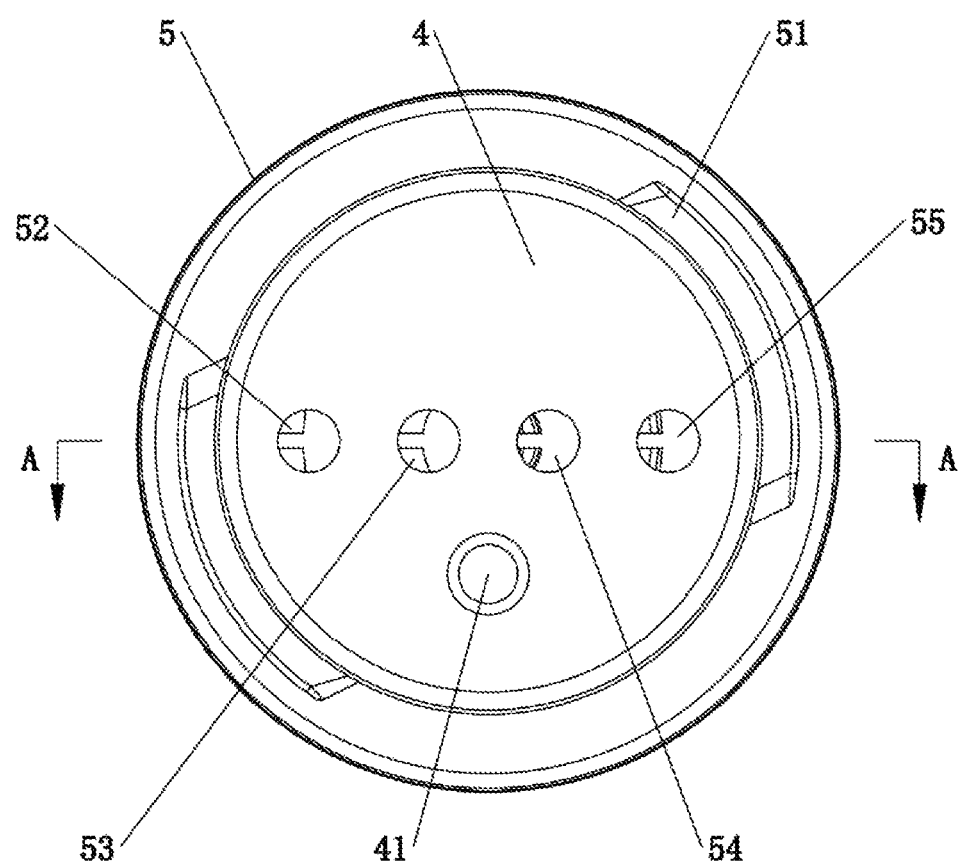
FIG. 3 is a bottom view schematically showing a structure of a composite filter cartridge according to one embodiment of the present invention.
Figure 4:
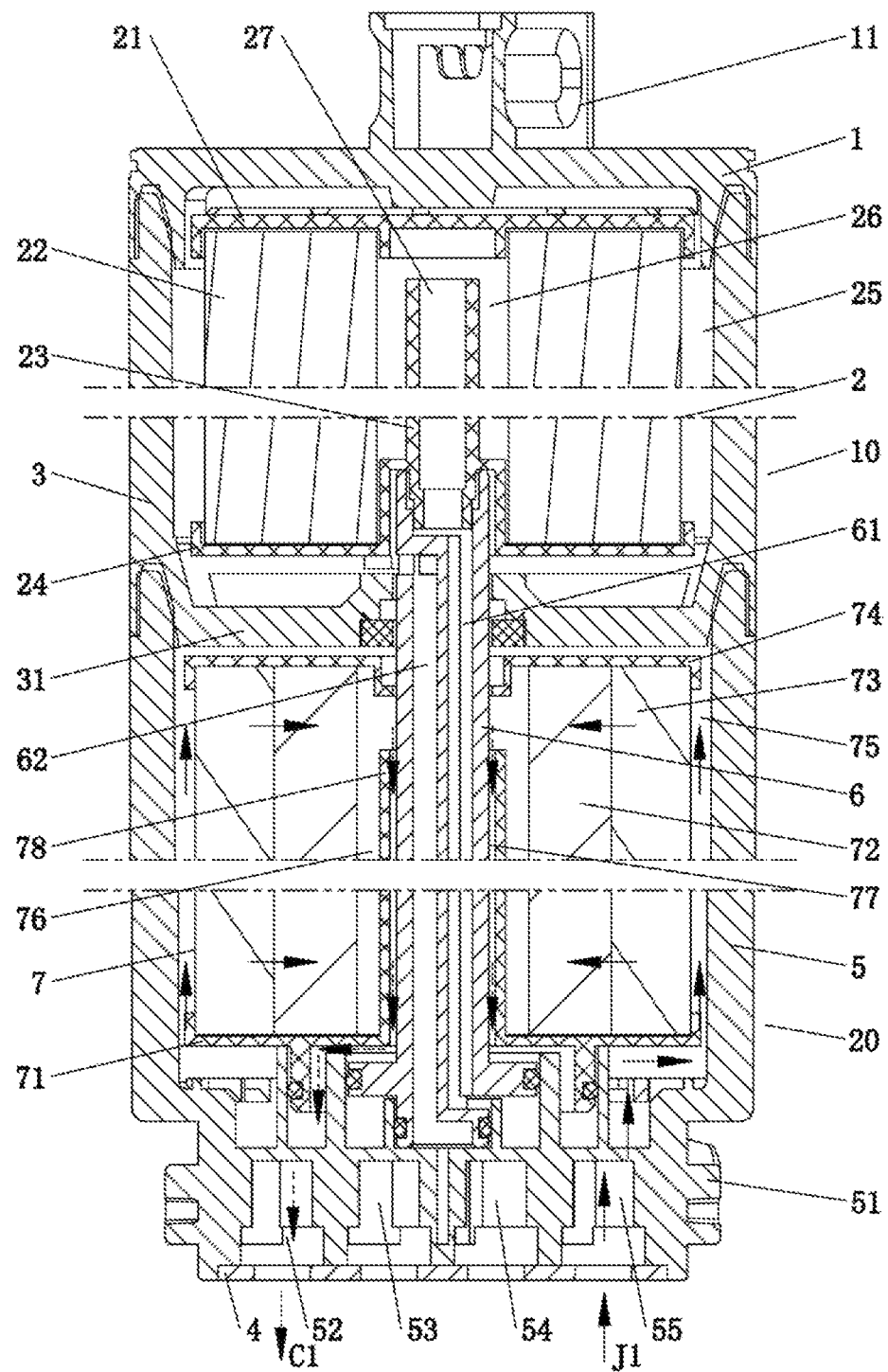
FIG. 4 is a sectional view taken along Line AA in FIG. 3 and schematically showing a structure of a composite filter cartridge (with a water flow direction) according to one embodiment of the present invention.
Figure 5:
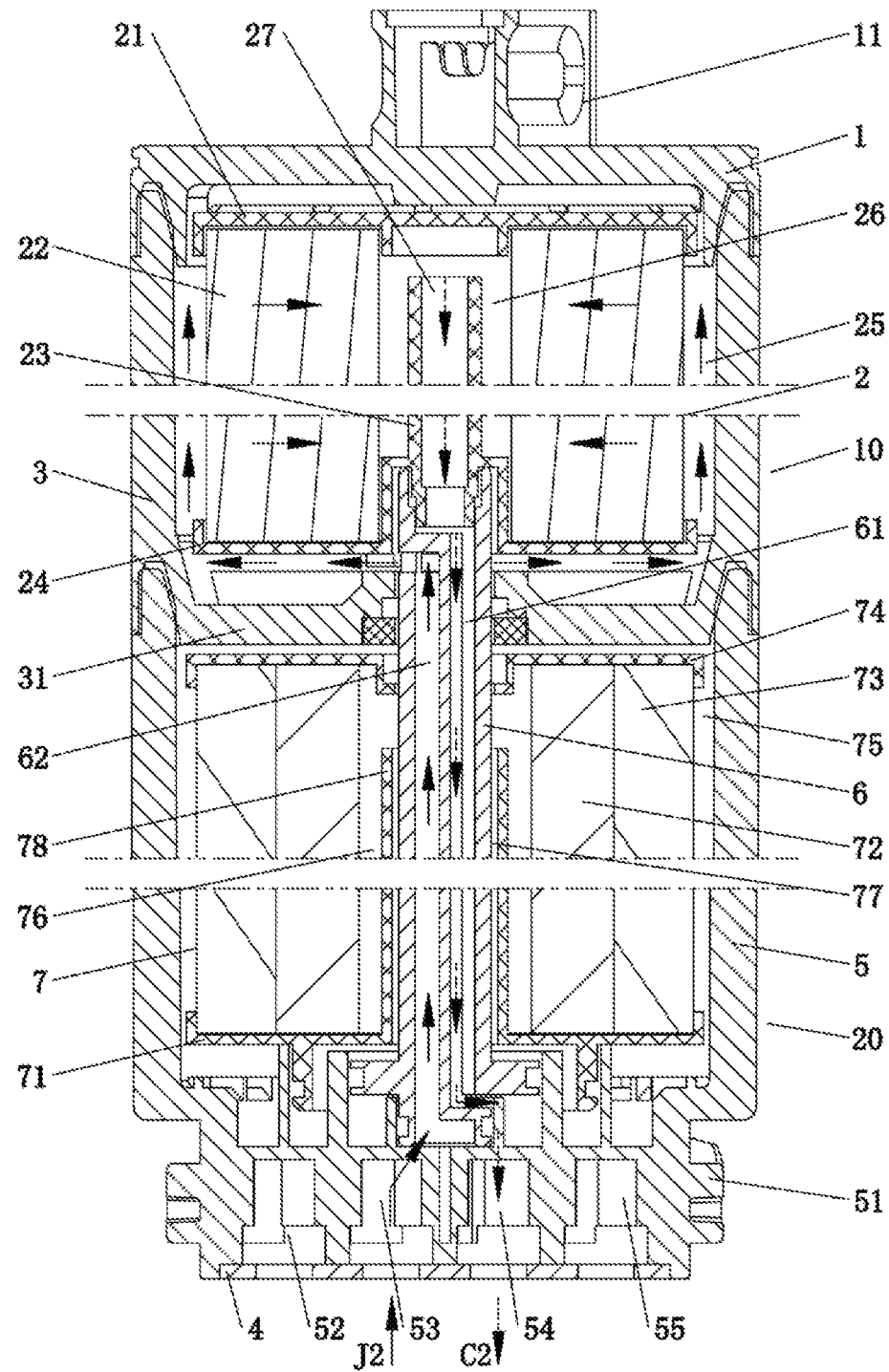
FIG. 5 is a sectional view taken along Line AA in FIG. 3 and schematically showing a structure of a composite filter cartridge (with another water flow direction) according to one embodiment of the present invention.

Refer to FIGS. 1-4. The present invention proposes a composite filter cartridge comprising a filter cartridge body provided with two filter devices. The two filter devices are respectively a first filter device 20 and a second filter device 10. The interior of the first filter device 20 is provided with a first water inlet cavity 75 and a first water outlet cavity. One end in the exterior of the first filter device 20 is provided with a first water inlet 55, a first water outlet 52, a second water inlet 53, and a second water outlet 54. Another end in the exterior of the first filter device 20 is connected with one end of the second filter device 10. Another end of the second filter device 10 is airtightly connected with a filter cover 1. The interior of the second filter device 10 is provided with a second water inlet cavity 25 and a second water outlet cavity. The second water inlet cavity 25 and the second water outlet cavity are respectively connected with the second water inlet 53 and the second water outlet 54 through a water conduit 6. The direction of the water flow in the first water inlet cavity 75 is indicated by a solid-line arrow J1 in FIG. 4. The direction of the water flow in the first water outlet cavity is indicated by a dotted-line arrow C1 in FIG. 4.

In one embodiment, the first filter device 20 includes a first housing 5 and a first filter module 7. One end of the first housing 5 is provided with the first water inlet 55, the first water outlet 52, the second water inlet 53, and the second water outlet 54. Another end of the first housing 5 is opened. The first filter module 7 is arranged inside the first housing 5. The filter module 7 includes a first cylindrical filter, a first end cover 71 and a second end cover 74, wherein the first end cover 71 and the second end cover 74 are respectively disposed at two ends of the first cylindrical filter. The first water inlet cavity 75 is formed between the outer surface of the first cylindrical filter and the inner wall of the first housing 5. The inner cavity of the first cylindrical filter functions as the first water outlet cavity. The first cylindrical filter includes two layers, i.e. an inner layer and an outer layer, wherein the inner layer is a first carbon filter layer 72, and the outer layer is an initial filter layer 73. The initial filter layer 73 may be made of a PP (polypropylene) cotton. The first end cover 71 is located near one end of the first housing 5. A first sleeve 78 is arranged in a region of the inner cavity of the first cylindrical filter, which is corresponding to the surface of the first end cover 71. The water conduit 6 passes the first sleeve 78. A first overflow gap 76 exists between the first sleeve 78 and the inner cavity of the first cylindrical filter. A second overflow gap 77 exists between the first sleeve 78 and the water conduit 6. The first overflow gap 76 and the second overflow gap 77 jointly form the first water outlet cavity.

In one embodiment, the second filter device 10 includes a second housing 3 and a second filter module 2. One end of the second housing 3 has a bottom plate 31; the bottom plate 31 is airtightly connected with the open end of the first housing 5. Another end of the second housing 3 is opened and airtightly connected with the filter cover 1. The second filter module 2 is arranged inside the second housing 3. The second filter module 2 includes a second cylindrical filter 22, a third end cover 24 and a fourth end cover 21, wherein the third end cover 24 and the fourth end cover 21 are respectively disposed at two ends of the second cylindrical filter 22. The second water inlet cavity 25 is formed between the outer surface of the second cylindrical filter 22 and the inner wall of the second housing 3. The inner cavity of the second cylindrical filter 22 functions as the second water outlet cavity. A water inlet channel 62 and a water outlet channel 61 are arranged inside the water conduit 6. The water conduit 6 passes the first water outlet cavity. Two ends of the water inlet channel 62 respectively interconnect with the second water inlet 53 and the second water inlet cavity 25. Two ends of the water outlet channel 61 respectively interconnect with the second water outlet 54 and the second water outlet cavity. The second cylindrical filter 22 is a carbon filter. The third end cover 24 is located near the first filter device 20. A second sleeve 23 is arranged in a region of the inner cavity of the second cylindrical filter 22, which is corresponding to the surface of the third end cover 24. A third overflow gap 26 exists between the second sleeve 23 and the inner cavity of the second cylindrical filter 22. An overflow channel 27 exists inside the second sleeve 23. The third overflow gap 26 and the overflow channel 27 jointly form the second water outlet cavity.

A handle 11 is disposed at the top of the filter cover 1. A cover plate 4 is disposed at one end of the first housing 5. The cover plate 4 has a positioning groove 41 and has holes respectively corresponding to the first water inlet 55, the first water outlet 52, the second water inlet 53, and the second water outlet 54. A protrusion fastener 51 is arranged in the perimeter of one end of the first housing 5.

What is claimed is:

1. A composite filter cartridge comprising a filter cartridge body provided with at least two filter devices, characterized in that each said filter device is provided with a support component for fixing said filter device and that said filter devices are arranged in a linear manner and fixed to one another;

wherein said at least two filter devices are respectively a first filter device and a second filter device, and wherein said first filter device includes a first water inlet cavity and a first water outlet cavity, and wherein one end of said first filter device is provided with a first water inlet, a first water outlet, a second water inlet, and a second water outlet, and wherein another end of said first filter device is connected with one end of said second filter device, and wherein another end of said second filter device is airtightly connected with a filter cover, and wherein said second filter device includes a second water inlet cavity and a second water outlet cavity, and wherein said second water inlet cavity and said second water outlet cavity are respectively connected with said second water inlet and said second water outlet through a water conduit.

2. The composite filter cartridge according to claim 1, wherein said first filter device includes a first housing and a first filter module, and wherein one end of said first housing is provided with said first water inlet, said first water outlet, said second water inlet, and said second water outlet, and wherein another end of said first housing is opened, and wherein said first filter module is arranged inside said first housing, and wherein said first filter module includes a first cylindrical filter, a first end cover and a second end cover, and wherein said first end cover and said second end cover are respectively disposed at two ends of said first cylindrical filter, and wherein said first water inlet cavity is formed between an outer surface of said first cylindrical filter and an inner wall of said first housing, and wherein an inner cavity of said first cylindrical filter functions as said first water outlet cavity, and wherein said second filter device includes a second housing and a second filter module, and wherein one end of said second housing has a bottom plate, and wherein said bottom plate is airtightly connected with an open end of said first housing, and wherein another end of said second housing is opened and airtightly connected with said filter cover, and wherein said second filter module is arranged inside said second housing, and wherein said second filter module includes a second cylindrical filter, a third end cover and a fourth end cover, wherein said third end cover and said fourth end cover are respectively disposed at two ends of said second cylindrical filter, and wherein said second water inlet cavity is formed between an outer surface of said second cylindrical filter and an inner wall of said second housing, and wherein an inner cavity of said second cylindrical filter functions as said second water outlet cavity, and wherein a water inlet channel and a water outlet channel are arranged inside said water conduit, and wherein said water conduit passes said first water outlet cavity, and wherein two ends of said water inlet channel respectively interconnect with said second water inlet and said second water inlet cavity, and wherein two ends of said water outlet channel respectively interconnect with said second water outlet and said second water outlet cavity.

3. The composite filter cartridge according to claim 2, wherein said first cylindrical filter includes two layers, which are an inner layer and an outer layer, and wherein said inner layer is a first carbon filter layer, and said outer layer is an initial filter layer.

4. The composite filter cartridge according to claim 2, wherein said second cylindrical filter is a carbon filter.

5. The composite filter cartridge according to claim 2, wherein said first end cover is located near one end of said first housing, and wherein a first sleeve is arranged in a region of an inner cavity of said first cylindrical filter, which is corresponding to an surface of said first end cover, and wherein said water conduit passes said first sleeve, and wherein a first overflow gap exists between said first sleeve and said inner cavity of said first cylindrical filter, and wherein a second overflow gap exists between said first sleeve and said water conduit, and wherein said first overflow gap and said second overflow gap jointly form said first water outlet cavity.

6. The composite filter cartridge according to claim 2, wherein said third end cover is located near said first filter device, and wherein a second sleeve is arranged in a region of an inner cavity of said second cylindrical filter, which is corresponding to an surface of said third end cover, and wherein a third overflow gap exists between said second sleeve and said inner cavity of said second cylindrical filter, and wherein an overflow channel exists inside said second sleeve, and wherein said third overflow gap and said overflow channel jointly form said second water outlet cavity.

* * * * *